United States Patent
Shen et al.

(10) Patent No.: US 9,733,293 B1
(45) Date of Patent: Aug. 15, 2017

(54) DIFFERENTIAL PIXEL TEST FOR CAPACITIVE TOUCH SCREENS

(71) Applicant: Qualcomm Technologies, Inc., San Diego, CA (US)

(72) Inventors: Guozhong Shen, San Jose, CA (US); Jon Pearson, Mukilteo, WA (US)

(73) Assignee: QUALCOMM Incorporated, San Diego, CA (US)

( * ) Notice: Subject to any disclaimer, the term of this patent is extended or adjusted under 35 U.S.C. 154(b) by 752 days.

(21) Appl. No.: 14/032,346

(22) Filed: Sep. 20, 2013

Related U.S. Application Data

(60) Provisional application No. 61/704,426, filed on Sep. 21, 2012.

(51) Int. Cl.
*G01R 31/28* (2006.01)
*G01R 31/02* (2006.01)

(52) U.S. Cl.
CPC .................................. *G01R 31/024* (2013.01)

(58) Field of Classification Search
CPC .......... G01R 27/26; G06F 3/041; G06F 3/045
USPC ......................... 348/146–147; 345/173–178; 324/658–690, 713
See application file for complete search history.

(56) References Cited

U.S. PATENT DOCUMENTS

| | | | | |
|---|---|---|---|---|
| 5,914,465 A * | 6/1999 | Allen | .................... | G06F 1/1626 178/18.06 |
| 8,519,722 B1 * | 8/2013 | Prendergast | ............ | G06F 3/044 324/658 |
| 9,104,273 B1 * | 8/2015 | Olson | ..................... | G06F 3/044 |
| 2004/0150399 A1 * | 8/2004 | Matsuo | .................. | G01R 33/56 324/309 |
| 2004/0183544 A1 | 9/2004 | Allan et al. | | |
| 2006/0132451 A1 * | 6/2006 | Salters | .................... | G06F 3/033 345/173 |
| 2007/0063983 A1 * | 3/2007 | Huang | ................. | G09G 3/3611 345/173 |
| 2007/0216657 A1 * | 9/2007 | Konicek | ............... | G06F 3/0412 345/173 |
| 2008/0048997 A1 * | 2/2008 | Gillespie | ............. | G06F 3/03547 345/174 |
| 2011/0050617 A1 * | 3/2011 | Murphy | ................ | G06F 3/0418 345/174 |
| 2011/0210944 A1 * | 9/2011 | Chen | ..................... | G06F 3/0418 345/174 |
| 2011/0248955 A1 * | 10/2011 | Mo | ......................... | G06F 3/044 345/174 |
| 2012/0050221 A1 * | 3/2012 | Kolokowsky | ........... | G06F 3/044 345/174 |

(Continued)

*Primary Examiner* — Son Le
*Assistant Examiner* — Alvaro Fortich
(74) *Attorney, Agent, or Firm* — Weaver Austin Villeneuve & Sampson LLP

(57) ABSTRACT

Techniques are described for testing a capacitive touch panel for the presence or absence of discontinuities. A pixel matrix is determined for a capacitive touch panel. The pixel matrix comprises pixel values representative of mutual capacitance of respective pixels of the capacitive touch panel. A difference matrix is generated from the pixel matrix. The difference matrix contains differences in pixel values for respective pixels of the capacitive touch panel with respect to pixel values of adjacent pixels. A determination may then be made from the difference matrix whether respective ones of the pixels of the capacitive touch panel contain a discontinuity.

26 Claims, 4 Drawing Sheets

(56) References Cited

U.S. PATENT DOCUMENTS

| | | | | |
|---|---|---|---|---|
| 2012/0062474 A1* | 3/2012 | Weishaupt | ............ | G06F 3/0416 345/173 |
| 2013/0050130 A1* | 2/2013 | Brown | .................... | G06F 3/044 345/174 |
| 2014/0085241 A1* | 3/2014 | Christiansson | ....... | G06F 3/0418 345/173 |

* cited by examiner

| -32 | -83 | 71 | 24 | -76 | -55 | 20 | -234 | 195 | 173 | -126 |
|---|---|---|---|---|---|---|---|---|---|---|
| -13 | -13 | -51 | -1 | -30 | -33 | -36 | -31 | -26 | -31 | 39 |
| 20 | 28 | 49 | -3 | 32 | -1 | 0 | 16 | 0 | 10 | -39 |
| -14 | 24 | 11 | -1 | -22 | -9 | -21 | -23 | -45 | -22 | 49 |
| -3 | -15 | 29 | 7 | 11 | 14 | -7 | -9 | 6 | 1 | -37 |
| -7 | 1 | 4 | 8 | -6 | 10 | -4 | -18 | -1 | -8 | 26 |
| -1139 | 1291 | -161 | -27 | -3 | 18 | 8 | 17 | -1 | -11 | -58 |
| 1161 | -1276 | 149 | 13 | -3 | 28 | 5 | -3 | 8 | 10 | 29 |
| -6 | -24 | -27 | 3 | -23 | -31 | 6 | -5 | -8 | 0 | -26 |
| 17 | 11 | 12 | 9 | 20 | 23 | 23 | 21 | 12 | 26 | -5 |
| -25 | -24 | -1 | -31 | -27 | -16 | -6 | -18 | -2 | -24 | -27 |
| 21 | 36 | 30 | 5 | 28 | 24 | 13 | 27 | 31 | 14 | 24 |
| -32 | -21 | -45 | -13 | -29 | -20 | -21 | -16 | -11 | -38 | -18 |
| 53 | 19 | 23 | 33 | 14 | 43 | 18 | 36 | 17 | 27 | 39 |
| -36 | -20 | -22 | -29 | -14 | -30 | -36 | -20 | -30 | -32 | -43 |
| 29 | 36 | 49 | 31 | 24 | 40 | 36 | 19 | 6 | 21 | 38 |
| -54 | -25 | -30 | -14 | -24 | -37 | -39 | -54 | -29 | -28 | -54 |
| 39 | 34 | 39 | 43 | 43 | 40 | 3 | 21 | 18 | 37 | 38 |
| 1 | -38 | -8 | -45 | 31 | -58 | -39 | 38 | -71 | -59 | -28 |

EXAMPLE 3

FIG. 2B

DIFFERENTIAL PIXEL TEST FOR CAPACITIVE TOUCH SCREENS

The present application claims priority, under 35 U.S.C. 119(e), to U.S. Provisional Application Ser. No. 61/704,426 entitled: DIFFERENTIAL PIXEL TEST FOR CAPACITIVE TOUCH SCREENS, filed on Sep. 21, 2012, the disclosure of which is herein incorporated by reference in its entirety.

BACKGROUND

A touch panel is a human machine interface (HMI) that allows an operator of an electronic device to provide input to the device using an instrument such as a finger, a stylus, and so forth. For example, the operator may use his or her finger to manipulate images on an electronic display, such as a display attached to a mobile computing device, a personal computer (PC), or a terminal connected to a network. In some cases, the operator may use two or more fingers simultaneously to provide unique commands, such as a zoom command, executed by moving two fingers away from one another; a shrink command, executed by moving two fingers toward one another; and so forth.

A touch screen is an electronic visual display that incorporates a touch panel overlying a display to detect the presence and/or location of a touch within the display area of the screen. Touch screens are common in devices such as all-in-one computers, tablet computers, satellite navigation devices, gaming devices, and smartphones. A touch screen enables an operator to interact directly with information that is displayed by the display underlying the touch panel, rather than indirectly with a pointer controlled by a mouse or touchpad. Capacitive touch panels are often used with touch screen devices. A capacitive touch panel generally includes an insulator, such as glass, coated with a transparent conductor, such as indium tin oxide (ITO). As the human body is an electrical conductor, touching the surface of the panel results in a distortion of the panel's electric field, measurable as a change in capacitance.

SUMMARY

Techniques are described for testing a capacitive touch panel for the presence or absence of discontinuities. In one or more implementations, a pixel matrix is determined for a capacitive touch panel. The pixel matrix comprises pixel values representative of mutual capacitance of respective pixels of the capacitive touch panel. A difference matrix is generated from the pixel matrix. The difference matrix contains differences in pixel values for respective pixels of the capacitive touch panel with respect to pixel values of adjacent pixels. The differences in pixel values are generated by comparing the pixel values for respective rows with the pixel values of an adjacent row and comparing the pixel values for respective columns with the pixel values of an adjacent column. A determination may then be made from the difference matrix whether respective ones of the pixels of the capacitive touch panel contain a discontinuity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. The use of the same reference numbers and/or labels in different instances in the description and the figures may indicate similar or identical items.

DETAILED DESCRIPTION

Overview

Figure 1:
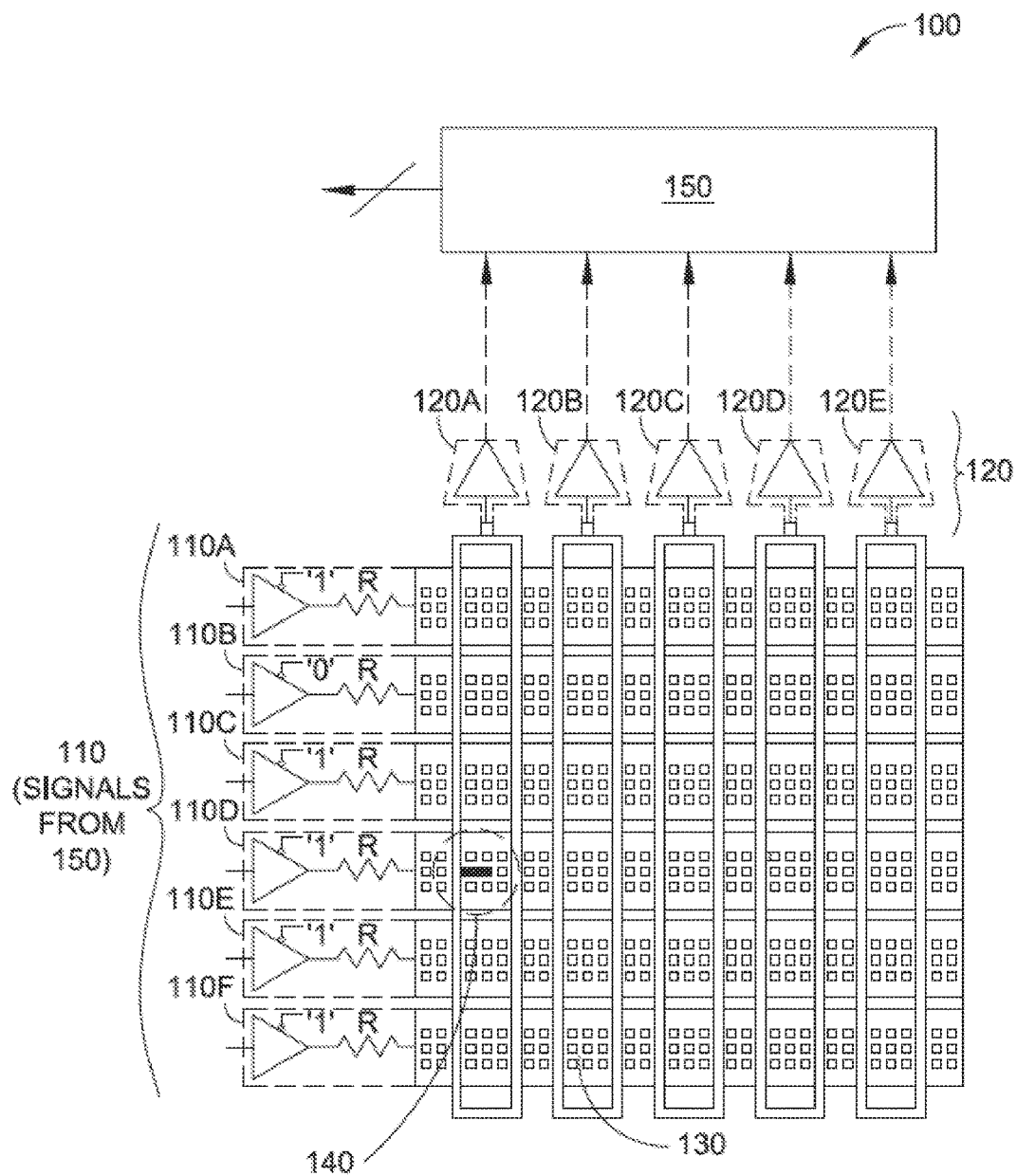
FIG. 1 is a simplified diagrammatic illustration that depicts a capacitive touch panel having a grid of drive lines and sense lines.

Touch panels that employ mutual capacitance measurement within an ITO grid pattern comprised of a plurality of transmitters (e.g., drive lines arranged along rows) and a plurality of receivers (e.g., sense lines arranged along columns) may incorporate elements into the pattern beyond a traditional row and column grid. These additional elements may provide visual continuity as well as serve to enhance the capacitive behavior of the pattern. The standard methods of testing such touch panels have relied upon an "open/short" test (e.g., to determine whether a row or column is shorted to another row or column or whether a row or column line broken) and a "baseline" test of the value measured at each row/column or transmit/receive (TX/RX) intersection. A line may short due to, for example, a micro-crack on a sensor line. Both of these tests may fail to detect defects in touch panels having more complex ITO patterns (e.g., beyond an orthogonal pattern) since the defect may involve a continuity (short connection) or discontinuity (open connection) involving an element in the pattern that is not connected to another sensor. Moreover, the baseline test employs a standard to which measured values of capacitance are compared. The use of such standards either unreasonably opens the limits between thresholds to accommodate a normally varying mutual capacitance profile (e.g., when a single pair of thresholds are used) or restricts the variation to a specific pattern (e.g., in the case of using a gold standard and a percentage variation). Additionally, pixel defects may go unrecognized because signal changes due to pixel level defects are typically smaller than the variance between pixels in a touch panel. Touch defects can lead to reduced touch accuracy in comparison to normal pixels and separation of one touch into multiple touches.

Accordingly, the techniques described herein allow a capacitive touch panel to be tested for the presence of aberrant discontinuities indicative of a defect (e.g., ITO defects, short circuits, open circuits, etc.) in one or more pixels of the touch panel. In one or more implementations, the techniques comprise a test process, which may be stored in a tangible computer storage medium and implemented by a test system. The test system may cause a pixel matrix to be determined for a capacitive touch panel undergoing testing. The pixel matrix comprises pixel values representative of mutual capacitance of respective pixels of the capacitive touch panel. For example, the test system may cause a plurality of images of the capacitive touch panel to be collected, wherein the images comprise pixel value samples are representative of the mutual capacitance of the respective pixels of the capacitive touch panel. The pixel value samples of the plurality of images for the respective pixels are averaged to generate the pixel matrix, wherein the pixel values of the pixel matrix comprise the average of the pixel value samples for respective pixels.

The test system may then cause a difference matrix to be generated from the pixel matrix. The difference matrix contains differences in pixel values for respective pixels of the capacitive touch panel with respect to pixel values of adjacent pixels, which are generated by comparing the pixel values for respective rows of the pixel matrix with the pixel values of an adjacent row of the pixel matrix and comparing the pixel values for respective columns of the pixel matrix with the pixel values of an adjacent column of the pixel matrix. A determination may then be made from the difference matrix whether respective ones of the pixels of the capacitive touch panel contain a discontinuity (e.g., aberrant discontinuity indicative of a defect).

The techniques described herein provide a simple yet powerful differential pixel test to determine unusual and detrimental defects (discontinuities) in capacitive touch panels employing advanced ITO patterns without resorting to artificial hard limits. The results of the differential pixel test, which are furnished by the difference matrix, depict the amount each pixel (intersection) in a capacitive touch panel differs from adjacent pixels (intersections), while normalizing for typical "channel" or "sensor" values. More uniform behavior (or profile) of the mutual capacitance across the touch panel, results in more consistent (e.g., accurate and linear) finger positions under various conditions (e.g., high noise, temperature shocks, water drops, and so forth).

Example Implementation

FIG. 1 illustrates a touch panel 100 in accordance with an example implementation of the present disclosure. The touch panel 100 may comprise a capacitive touch panel that includes drive lines (electrodes) 110A-110F (collectively, 110), such as cross-bar ITO drive traces/tracks, arranged next to one another (e.g., along parallel tracks, generally parallel tracks, and so forth). As shown, the drive lines 110 are elongated (e.g., extending along a longitudinal axis). For example, each drive line 110 may extend along an axis on a supporting surface, such as a substrate of the touch panel 100. The drive lines 110 have a pitch (e.g., a substantially repetitive spacing between adjacent axes of the drive lines 110). In implementations, the drive lines 110 also have a characteristic spacing comprising a minimum distance between adjacent edges of the drive lines 110.

The touch panel 100 also includes sense lines (electrodes) 120A-120E (collectively, 120), such as cross-bar ITO sensor traces/tracks, arranged next to one another across the drive lines 110 (e.g., along parallel tracks, generally parallel tracks, and so forth). The sense lines 110 are elongated (e.g., extending along a longitudinal axis). For instance, each sense line 120 may extend along an axis on a supporting surface, such as a substrate of the touch panel 100. The sense lines 120 also have a pitch (e.g., a substantially repetitive spacing between adjacent axes of the sense lines 120). In implementations, the sense lines 120 have a characteristic spacing comprising a minimum distance between adjacent edges of the sense lines 120.

As shown in FIG. 1, the touch panel 100 includes sense lines 120 that are patterned. However, it is contemplated that either or both the drive lines 110 and sense lines 120 may be patterned (e.g., may include shaped elements), and may not necessarily be uniform along their entire lengths. A variety of patterns are contemplated.

One or more capacitive touch panels 100 can be included with a touch screen assembly. The touch screen assembly may include a display screen, such as an LCD screen, where the sensor layer and the drive layer are sandwiched between the LCD screen and a bonding layer, e.g., with a protective cover such as glass attached thereto. The protective cover may include a protective coating, an anti-reflective coating, and so forth. The protective cover may comprise a touch surface, upon which an operator can use one or more of fingers, a stylus, and so forth to input commands to the touch screen assembly that are detected as capacitive differences by the touch panel 110. The commands can be used to manipulate graphics displayed by, for example, the LCD screen. Further, the commands can be used as input to an electronic device connected to a capacitive touch panel 100, such as a multimedia device or another electronic device.

As shown in FIG. 1, the drive lines 110 and the sense lines 120 define a coordinate system where the coordinate locations comprise a capacitor formed at the intersection between one of the drive lines 110 and one of the sense lines 120. These coordinate locations are referred to as "pixels" 130. Thus, the drive lines 110 are configured to connect to an electrical current source (e.g., from a touchscreen controller (TSC) 150) for generating a local electric field at each capacitor, where a change in the local electric field generated by a finger and/or a stylus at a capacitor causes a decrease in capacitance associated with a touch at the corresponding coordinate location. In this manner, more than one touch can be sensed at differing coordinate locations simultaneously (or at least substantially simultaneously). In implementations, the drive lines 110 can be driven by the electrical current source in parallel, e.g., where a set of different signals are provided to the drive lines 110. In other implementations, the drive lines 110 can be driven by the electrical current source in series, e.g., where each drive line 110 or subset of drive lines 110 is driven one at a time.

The sense lines 120 are electrically insulated from the drive lines 110 (e.g., using a dielectric layer, and so forth). For example, the sense lines 120 are provided on one substrate (e.g., comprising a sense layer disposed on a glass substrate), and the drive lines 110 provided on a separate substrate (e.g., comprising a drive layer disposed on another substrate). In this two-layer configuration, the sense layer can be disposed above the drive layer (e.g., with respect to a touch surface). For example, the sense layer can be positioned closer to a touch surface than the drive layer. However, this configuration is provided by way of example only and is not meant to be restrictive of the present disclosure. Thus, other configurations can be provided where the drive layer is positioned closer to the touch surface than the sense layer, and/or where the sense layer and the drive layer comprise the same layer. For instance, in a 1.5-layer implementation (e.g., where the drive layer and the sense layer are included on the same layer but physically separated from one another), one or more jumpers can be used to connect portions of a drive line 110 together. Similarly, jumpers can be used to connect portions of a sense line 120 together.

Thus, as shown in FIG. 1, the touch panel 100 may be viewed as including a grid of drive lines 110 and sense lines 120 defining a plurality of pixels 130. The drive lines 110 receive drive signals from the touchscreen controller (TSC) 150, while signals generated on the sense lines 120 are routed to the TSC 150 for processing. During operation, the TSC 150 generates signals on the drive lines 100. Corresponding signals sensed on the sense lines 120 indicate the location of a touch by one or more capacitive objects (e.g., fingers, styluses, and so forth) on the surface of the touch panel 100. Consequently, the function of the touch screen 100 may be hampered due to defects in the drive electrodes 110 and sense electrodes 120. For example, FIG. 1 illustrates a defect 140 in a sense electrodes 120 of the touch panel 100, wherein ITO shorts sense line 120A with a dummy ITO element creating a change in the mutual capacitance between the drive electrodes 110 and sense electrodes 120 at that pixel 140 (intersection).

Figure 2A:
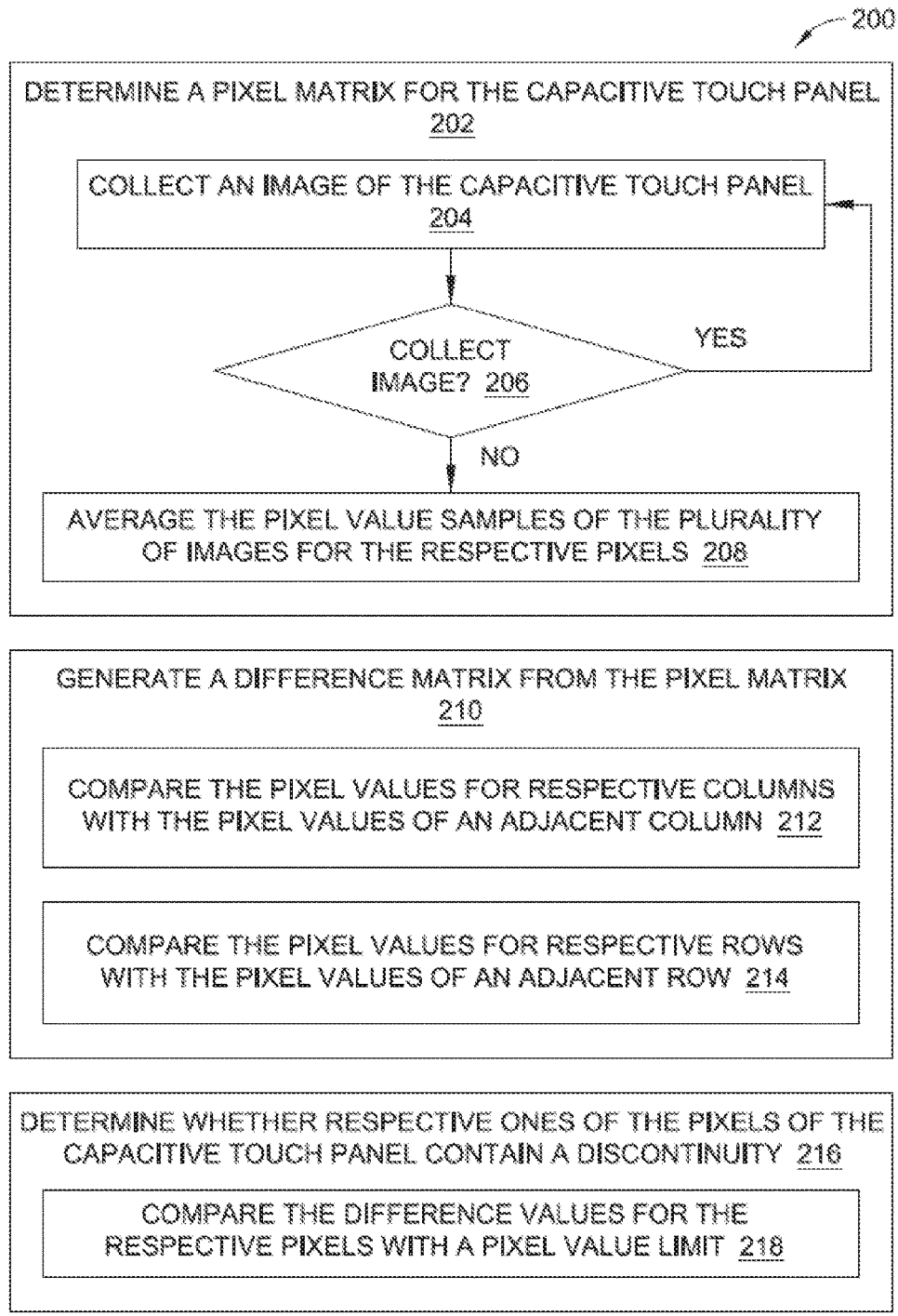
FIG. 2 is a flow diagram that illustrates a method for determining defects in a capacitive touch panel, such as the capacitive touch panel shown in FIG. 1, in accordance with an example implementation of the present disclosure.

FIG. 2 illustrates a process (method) 200 for testing of a capacitive touch panel, such as the touch panel touch panel 100 shown in FIG. 1, in accordance with an example implementation of the present disclosure. As shown, a pixel matrix is determined for a capacitive touch panel (Block 202) such as the capacitive touch panel 100 shown in FIG. 1. The pixel matrix comprises pixel values representative of (e.g., proportional to and/or offset from) the mutual capacitance of respective pixels 130 of the capacitive touch panel 100. Thus, in embodiments, a pixel value representative of the mutual capacitance of each pixel 130 of the capacitive touch screen 100 may be measured and assigned to the pixel matrix. However, it is contemplated that not all pixels 130 of the capacitive touch panel 100 may have a measured pixel value.

In implementations, one or more of images of the capacitive touch panel 100 may be created, and used to generate the pixel matrix, wherein the images comprise pixel value samples representative of the mutual capacitance of the respective pixels 130 of the capacitive touch panel 100. For example, a plurality of images of the capacitive touch panel 100 may be collected, and averaged to generate the pixel matrix, wherein the pixel values of the pixel matrix comprise the average of the pixel value samples for respective pixels 130 of the touch panel 100. Thus, as shown in FIG. 2, an image of the capacitive touch panel may be collected (Block 204) and stored (e.g., in a memory associated with the test system). A determination may then be made whether additional images of the touch panel are to be collected (Decision Block 206). For example, a number of images (e.g., 32, 50, etc.) of the capacitive touch screen that are to be collected may be designated during set up of the test. When a determination is then made that an additional image is to be collected ("YES" at Decision Block 206), another image of the capacitive touch panel is collected (Block 204). This process is repeated until the designated number of images is collected, and a determination is made that no additional images of the capacitive touch panel are to be collected. ("NO" at Decision Block 206). The pixel value samples of the plurality of images for the respective pixels are averaged (Block 208) to generate the pixel matrix, wherein the pixel values of the pixel matrix comprise the average of the pixel value samples for the respective pixels 130 of the capacitive touch panel 100 (e.g., for each pixel 130 of the capacitive touch panel 100, for a designated number of the pixels 130 of the touch panel 100, and so forth). An example pixel matrix for a twelve by twenty (12×20) pixel 130 capacitive touch screen 100 is illustrated in EXAMPLE 1.

A difference matrix is generated from the pixel matrix (Block 210). The difference matrix contains differences in pixel values for respective pixels of the capacitive touch panel with respect to pixel values of adjacent pixels (difference values). The difference values are generated by comparing the pixel values for respective columns of the pixel matrix with the pixel values of an adjacent column of the pixel matrix (Block 212) and comparing the pixel values for respective rows of the pixel matrix with the pixel values of an adjacent row of the pixel matrix (Block 214). For example, the columns of the pixel matrix may be selected successively and the pixel values for respective pixels of the selected column subtracted from corresponding pixel values for pixels in respective rows of a column adjacent to the selected column to yield a column difference matrix. Thus, for the example pixel matrix shown in EXAMPLE 1, beginning with the second column of the pixel matrix, each pixel value in the column is subtracted from the pixel value of the pixel in the same row of the immediately preceding column. This step is repeated for each column across the pixel matrix (e.g. the third column through the twelfth column) to yield the column difference matrix shown in EXAMPLE 2. Thus, the column difference matrix has one (1) fewer columns than the pixel matrix shown in EXAMPLE 1 (e.g., the column difference matrix of EXAMPLE 2 is an eleven by twenty (11×20) matrix).

```
-2184 -2782 -1917 -1966 -1770 -2891 -2405 -2503 -1482 -2261 -2482 -2800
 -284  -914  -132  -110   110 -1087  -656  -734    53  -531  -579 -1023
 -114  -757    12   -17   202 -1025  -627  -741    15  -595  -674 -1079
 -270  -893   -96   -76   140 -1055  -658  -772     0  -610  -679 -1123
   91  -546   275   306   521  -696  -308  -443   306  -349  -440  -835
  215  -425   381   441   663  -543  -141  -283   457  -192  -282  -714
  402  -245   562   626   856  -356    56   -90   632   -18  -116  -522
  534 -1252   846   749   952  -263   167    29   768   117     8  -456
  602   -23   799   851  1067  -151   307   174   910   267   168  -267
  760   129   927   952  1171   -70   357   230   961   310   211  -250
  809   195  1004  1041  1269    48   498   394  1146   507   434   -32
 1039   400  1185  1221  1418   170   604   494  1228   587   490    -3
  805   187  1008  1074  1276    56   514   417  1178   568   485    16
 1210   560  1360  1381  1570   321   759   641  1386   765   644   157
 1081   484  1303  1347  1569   334   815   715  1496   892   798   350
 1415   782  1581  1603  1796   547   998   862  1623   989   863   372
 1311   707  1542  1613  1837   612  1103  1003  1783  1155  1050   597
 1496   838  1648  1689  1899   650  1104   965  1691  1034   901   394
 1463   844  1688  1768  2021   815  1309  1173  1920  1281  1185   716
  723   105   911   983  1191    16   452   277  1062   352   197  -300
```

Example 1

Next, the rows of the column difference matrix may be selected successively and the column difference values for respective pixels of the selected row subtracted from corresponding column difference values for pixels in respective columns of a row adjacent to the selected row to yield the difference matrix, wherein each element of the difference matrix comprises a difference value. Thus, for the example column difference matrix shown in EXAMPLE 2, beginning with the second row of the column difference matrix, each pixel value in the row is subtracted from the pixel value of the pixel in the same column of the immediately preceding row. This step is repeated for the rows across the column difference matrix (e.g. the third row through the twentieth row) to yield the difference matrix shown in EXAMPLE 3. Thus, the column difference matrix has one (1) fewer row and one (1) fewer column than the pixel matrix shown in EXAMPLE 1 (e.g., the difference matrix of EXAMPLE 3 is an eleven by nineteen (11×19) matrix).

| 598 | −865 | 49 | −196 | 1121 | −486 | 98 | −1021 | 779 | 221 | 318 |
|---|---|---|---|---|---|---|---|---|---|---|
| 630 | −782 | −22 | −220 | 1197 | −431 | 78 | −787 | 584 | 48 | 444 |
| 643 | −769 | 29 | −219 | 1227 | −398 | 114 | −756 | 610 | 79 | 405 |
| 623 | −797 | −20 | −216 | 1195 | −397 | 114 | −772 | 610 | 69 | 444 |
| 637 | −821 | −31 | −215 | 1217 | −388 | 135 | −749 | 655 | 91 | 395 |
| 640 | −806 | −60 | −222 | 1206 | −402 | 142 | −740 | 649 | 90 | 432 |
| 647 | −807 | −64 | −230 | 1212 | −412 | 146 | −722 | 650 | 98 | 406 |
| 1786 | −2098 | 97 | −203 | 1215 | −430 | 138 | −739 | 651 | 109 | 464 |
| 625 | −822 | −52 | −216 | 1218 | −458 | 133 | −736 | 643 | 99 | 435 |
| 631 | −798 | −25 | −219 | 1241 | −427 | 127 | −731 | 651 | 99 | 461 |
| 614 | −809 | −37 | −228 | 1221 | −450 | 104 | −752 | 639 | 73 | 466 |
| 639 | −785 | −36 | −197 | 1248 | −434 | 110 | −734 | 641 | 97 | 493 |
| 618 | −821 | −66 | −202 | 1220 | −458 | 97 | −761 | 610 | 83 | 469 |
| 650 | −800 | −21 | −189 | 1249 | −438 | 118 | −745 | 621 | 121 | 487 |
| 597 | −819 | −44 | −222 | 1235 | −481 | 100 | −781 | 604 | 94 | 448 |
| 633 | −799 | −22 | −193 | 1249 | −451 | 136 | −761 | 634 | 126 | 491 |
| 604 | −835 | −71 | −224 | 1225 | −491 | 100 | −780 | 628 | 105 | 453 |
| 658 | −810 | −41 | −210 | 1249 | −454 | 139 | −726 | 657 | 133 | 507 |
| 619 | −844 | −80 | −253 | 1206 | −494 | 136 | −747 | 639 | 96 | 469 |
| 618 | −806 | −72 | −208 | 1175 | −436 | 175 | −785 | 710 | 155 | 497 |

Example 2

A determination can be made from the difference matrix whether respective ones of the pixels of the capacitive touch panel contain a discontinuity (Block 216). For instance, in implementations, the difference values for the respective pixels of the difference matrix may be compared with one or more pixel value limits (Block 218). For example, the difference matrix includes a first (left) edge column, a second (right) edge column of pixel values, a first (top) edge row, and a second (bottom) edge row of difference values. The remaining difference values of the difference matrix comprise center difference values (in EXAMPLE 3, the edge rows and edge columns of difference values, which are outside the dashed box, are italicized, while the center values, which are inside the dashed line box, are not italicized). Thus, the absolute value of the difference values for respective pixels in one of the first edge column, the second edge column, the first edge row, or the second edge row is compared with an edge pixel value limit, while the difference values for respective pixels (center difference values) are compared to a center pixel value limit. In implementations, the center pixel value limit is different than the edge pixel value limit, e.g., less than the edge pixel value limit. Thus, in the example shown, an edge pixel limit of 300 to 500 may be selected, while a center pixel limit of 100-300 may be selected. Accordingly, the presence of a discontinuity is indicated by the pixels of the difference matrix having the difference values:

| −1139 | 1291 |
|---|---|
| 1161 | −1276 | which are shown bolded in EXAMPLE 3.

In the preceding examples, the difference values are generated by first comparing the pixel values for respective columns of the pixel matrix with the pixel values of an adjacent column of the pixel matrix to yield an intermediate column difference matrix, and then comparing the pixel values for respective rows of the pixel matrix with the pixel values of an adjacent row of the column difference matrix to yield the difference matrix. However, the difference values may also be generated by first comparing the pixel values for respective rows of the pixel matrix with the pixel values of an adjacent row of the column difference matrix to yield an intermediate row difference matrix, and then comparing the pixel values for respective columns of the pixel matrix with the pixel values of an adjacent column of the pixel matrix to yield the difference matrix.

Example Test System

Figure 3:
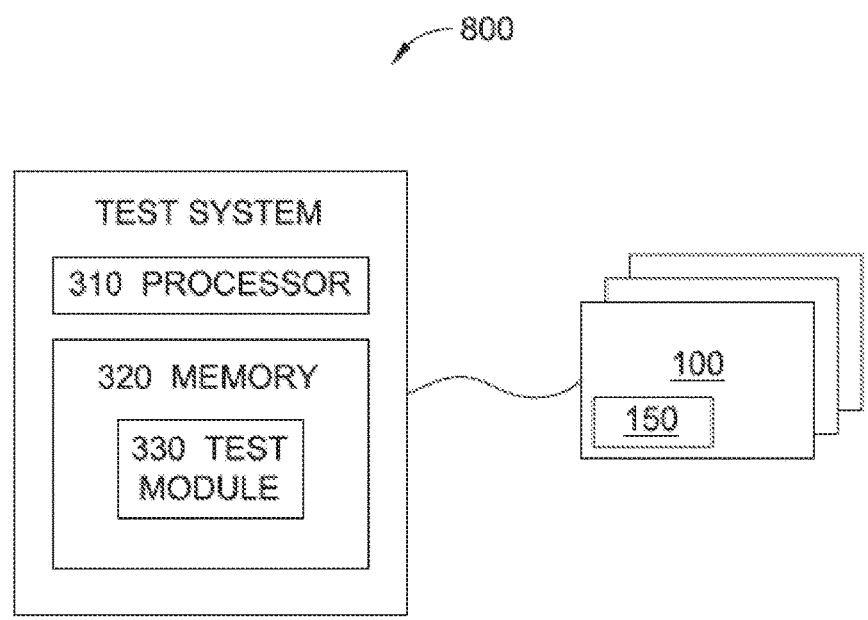
FIG. 3 is a block diagram that illustrates a touch panel undergoing testing using a test system in accordance with an example implementation of the present disclosure.

FIG. 3 illustrates a test system 300 coupled to the touch panel 100 undergoing testing in accordance with an example implementation of techniques of the present disclosure. The test system 300 may be configured in a variety of ways. In FIG. 1, the test system 300 is illustrated as including a processor 310 and a memory 320. The processor 310 provides processing functionality for the test system 100 and may include any number of processors, micro-controllers, or other processing systems, and resident or external memory for storing data and other information accessed or generated by the test system 100. The processor 310 may execute one or more software programs that implement the techniques and modules described herein. The processor 310 is not limited by the materials from which it is formed or the processing mechanisms employed therein and, as such, may be implemented via semiconductor(s) and/or transistors (e.g., electronic integrated circuits (ICs)), and so forth.

The memory 320 is an example of a non-transitory computer storage device that provides storage functionality to store various data associated with the operation of the test system, such as the software program and code segments mentioned above, computer instructions, and/or other data to instruct the processor 310 and other elements of the test system 300 to perform the techniques described herein. Although a single memory 320 is shown, a wide variety of types and combinations of memory may be employed. The memory 320 may be integral with the processor 310, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth.

The test system 300 is illustrated as including a test module 330, which is storable in memory 320 and executable by the processor 310. The test module 330 represents functionality to test capacitive touch panels 100 for defects in their drive and sense lines. For example, the test module 330 may implement the techniques of the present disclosure (e.g., may implement the process (method) 200 in FIG. 2 to test one or more touch panels 100 for defects in the drive and sense lines of the panels 100.

During the test setup, the test system 300 is coupled to the touch panel 100. The test system 300 interfaces with the touch screen controller (TSC) 150 (see also FIG. 1) to control the drive lines 110, read the sense lines 120, and process the signals on the sense lines 120, e.g., via the test module 330. During the distributed pixel test, the test module 330 may cause the touch panel 100 to be operated in accordance with process (method) 200 of FIG. 2 (e.g., by furnishing instructions to control operation of the TSC 150), so that defects in the touch panel 100 may be detected.

Generally, any of the techniques described herein can be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the test system 300 of FIG. 3 can be wired, wireless, or some combination thereof. In the case of a software implementation, for instance, the module represents executable instructions that perform specified tasks when executed on a processor, such as the processor 310 of the test system 300 shown in FIG. 3. The program code can be stored in one or more non-transitory computer storage devices, an example of which is the memory 320 associated with the test system 300 of FIG. 3.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A process for testing pixels of a capacitive touch panel, the process comprising:
   determining, by a test system coupled to a capacitive touch panel, pixel values representative of mutual capacitances of pixels of the capacitive touch panel, each of the pixels corresponding to a capacitor formed at an intersection between a drive line and a sense line of the capacitive touch panel, wherein the determining involves:
      causing an electrical current source to drive a plurality of drive lines to generate a local electric field at each pixel of a plurality of pixels; and
      obtaining signals, from sense lines of the capacitive touch panel, corresponding to the mutual capacitances;
   generating, by the test system, a pixel value matrix that includes the pixel values arranged in a plurality of rows and a plurality of columns;
   for each column of pixel values in the pixel value matrix, determining, by the test system, first difference values between the respective pixel values in the column and respective pixel values in an adjacent column;
   generating, by the test system, an intermediate matrix that includes the first difference values arranged in associated rows and columns;
   for each row of first difference values in the intermediate value matrix, determining, by the test system, second difference values between the respective first difference values in the row with respective first difference values in an adjacent row;
   generating, by the test system, a difference matrix that includes the second difference values arranged in associated rows and columns;
   comparing, by the test system, one or more of the second difference values in the difference matrix to one or more threshold values; and
   determining, by the test system, whether one or more of the pixels of the capacitive touch panel are defective, based on the comparisons.

2. The process as recited in claim 1, wherein determining the pixel values representative of the mutual capacitances of the respective pixels comprises:
   performing two or more measurements of pixel value samples representative of the mutual capacitances of the respective pixels; and
   averaging the two or more measured pixel value samples obtained for each of the respective pixels to determine the respective pixel values for the pixel value matrix, the pixel values of the pixel value matrix comprising the average of the pixel value samples for the respective pixels.

3. The process as recited in claim 1, wherein the determining, for each row of first difference values in the intermediate value matrix, the second difference values between the respective first difference values in the row and respective first difference values in an adjacent row comprises successively selecting rows and, for each selected row, subtracting the first difference values in the selected row from corresponding first difference values in the adjacent row.

4. The process as recited in claim 1, wherein the determining, for each column of pixel values in the pixel value matrix, the first difference values between the respective pixel values in the column and respective pixel values in an adjacent column comprises successively selecting columns and, for each selected column, subtracting the pixel values in the selected column from corresponding pixel values in the adjacent column.

5. The process as recited in claim 1, wherein the determining of whether respective ones of the pixels of the capacitive touch panel are associated with a defect based on the comparisons comprises determining, for each of the one or more second difference values, whether the second difference value is less than a pixel value limit threshold, wherein if the second difference value is not less than the pixel value limit threshold, the pixel is determined to be associated with a defect.

6. The process as recited in claim 5, wherein the comparing of the one or more of the second difference values in the difference matrix to the one or more threshold values comprises comparing the absolute values of the one or more of the second differences values in the first and last rows and first and last columns of the difference matrix with an edge pixel value limit.

7. The process as recited in claim 6, wherein the comparing of the one or more of the second difference values in the difference matrix to the one or more threshold values comprises comparing the absolute values of the one or more of the second differences values not in either of the first and last rows and not in either of the first and last columns of the difference matrix with a center pixel value limit different than the edge pixel value limit.

8. The process as recited in claim 7, wherein the center pixel value limit is less than the edge pixel value limit.

9. The process as recited in claim 1, wherein the defect is associated with a value that is less than a value of a variance between pixel values for respective pixels in the capacitive touch panel.

10. A test system capable of testing pixels of a capacitive touch panel, the test system comprising:
   a memory operable to store one or more modules;
   apparatus for coupling the test system to a capacitive touch panel; and
   a processor operable to execute the one or more modules to:
      determine pixel values representative of mutual capacitances of pixels of the capacitive touch panel, each of the pixels corresponding to a capacitor formed at an intersection between a drive line and a sense line of the capacitive touch panel, wherein the determining involves:

causing an electrical current source to drive a plurality of drive lines to generate a local electric field at each pixel of a plurality of pixels; and obtaining signals, from sense lines of the capacitive touch panel, corresponding to the mutual capacitances;

generate a pixel value matrix that includes the pixel values arranged in a plurality of rows and a plurality of columns;

for each column of pixel values in the pixel value matrix, determine first difference values between the respective pixel values in the column and respective pixel values in an adjacent column;

generate an intermediate matrix that includes the first difference values arranged in associated rows and columns;

for each row of first difference values in the intermediate value matrix, determine second difference values between the respective first difference values in the row with respective first difference values in an adjacent row;

generate a difference matrix that includes the second difference values arranged in associated rows and columns;

compare one or more of the second difference values in the difference matrix to one or more threshold values; and determine whether one or more of the pixels of the capacitive touch panel are defective based on the comparisons.

11. The test system as recited in claim 10, wherein to determine the pixel values representative of the mutual capacitances of the respective pixels, the processor is further operable to execute the one or more modules to:

perform two or more measurements of pixel value samples representative of the mutual capacitances of the respective pixels; and average the two or more measured pixel value samples obtained for each of the respective pixels to determine the respective pixel values for the pixel value matrix, the pixel values of the pixel value matrix comprising the average of the pixel value samples for the respective pixels.

12. The test system as recited in claim 10, wherein to determine, for each row of first difference values in the intermediate value matrix, the second difference values between the respective first difference values in the row and respective first difference values in an adjacent row, the processor is further operable to execute the one or more modules to: successively select rows and, for each selected row, subtract the first difference values in the selected row from corresponding first difference values in the adjacent row.

13. The test system as recited in claim 10, wherein to determine, for each column of pixel values in the pixel value matrix, the first difference values between the respective pixel values in the column and respective pixel values in an adjacent column, the processor is further operable to execute the one or more modules to: successively select columns and, for each selected column, subtract the pixel values in the selected column from corresponding pixel values in the adjacent column.

14. The test system as recited in claim 10, wherein to determine whether respective ones of the pixels of the capacitive touch panel are associated with a defect based on the comparisons, the processor is operable to execute the one or more modules to determine, for each of the one or more second difference values, whether the second difference value is less than a pixel value limit threshold, wherein if the second difference value is not less than the pixel value limit threshold, the pixel is determined to be associated with a defect.

15. The test system as recited in claim 14, wherein the defect is associated with a value that is less than a value of a variance between pixel values for respective pixels of the capacitive touch panel.

16. The test system as recited in claim 14, wherein to compare the one or more of the second difference values in the difference matrix to the one or more threshold values, the processor is further operable to execute the one or more modules to compare the absolute values of the one or more of the second differences values in the first and last rows and first and last columns of the difference matrix with an edge pixel value limit.

17. The test system as recited in claim 16, wherein to compare the one or more of the second difference values in the difference matrix to the one or more threshold values, the processor is further operable to execute the one or more modules to compare the absolute values of the one or more of the second differences values not in either of the first and last rows and not in either of the first and last columns of the difference matrix with a center pixel value limit different than the edge pixel value limit.

18. The test system as recited in claim 17, wherein the center pixel value limit is less than the edge pixel value limit.

19. One or more tangible computer-readable storage media storing computer executable instructions for testing pixels of a capacitive touch panel, the computer executable instructions comprising instructions for:

determining, by a test system coupled to a capacitive touch panel, pixel values representative of mutual capacitances of pixels of the capacitive touch panel, each of the pixels corresponding to a capacitor formed at an intersection between a drive line and a sense line of the capacitive touch panel, wherein the determining involves:

causing an electrical current source to drive a plurality of drive lines to generate a local electric field at each pixel of a plurality of pixels; and obtaining signals, from sense lines of the capacitive touch panel, corresponding to the mutual capacitances;

generating, by the test system, a pixel value matrix that includes the pixel values arranged in a plurality of rows and a plurality of columns;

for each column of pixel values in the pixel value matrix, determining, by the test system, first difference values between the respective pixel values in the column and respective pixel values in an adjacent column;

generating, by the test system, an intermediate matrix that includes the first difference values arranged in associated rows and columns;

for each row of first difference values in the intermediate value matrix, determining, by the test system, second difference values between the respective first difference values in the row with respective first difference values in an adjacent row;

generating, by the test system, a difference matrix that includes the second difference values arranged in associated rows and columns;

comparing, by the test system, one or more of the second difference values in the difference matrix to one or more threshold values; and determining, by the test system, whether one or more of the pixels of the capacitive touch panel are defective based on the comparisons.

20. The one or more tangible computer readable storage media as recited in claim 19, wherein determining the pixel values representative of the mutual capacitances of the respective pixels comprises:

performing two or more measurements of pixel value samples representative of the mutual capacitances of the respective pixels; and averaging the two or more measured pixel value samples obtained for each of the respective pixels to determine the respective pixel values for the pixel value matrix, the pixel values of the pixel value matrix comprising the average of the pixel value samples for the respective pixels.

21. The one or more tangible computer readable storage media as recited in claim 19, wherein the determining, for each row of first difference values in the intermediate value matrix, the second difference values between the respective first difference values in the row and respective first difference values in an adjacent row comprises successively selecting rows and, for each selected row, subtracting the first difference values in the selected row from corresponding first difference values in the adjacent row.

22. The one or more tangible computer readable storage media as recited in claim 19, wherein the determining, for each column of pixel values in the pixel value matrix, the first difference values between the respective pixel values in the column and respective pixel values in an adjacent column comprises successively selecting columns and, for each selected column, subtracting the pixel values in the selected column from corresponding pixel values in the adjacent column.

23. The one or more tangible computer readable storage media as recited in claim 19, wherein the determining of whether respective ones of the pixels of the capacitive touch panel are associated with a defect based on the comparisons comprises determining, for each of the one or more second difference values, whether the second difference value is less than a pixel value limit threshold, wherein if the second difference value is not less than the pixel value limit threshold, the pixel is determined to be associated with a defect.

24. The one or more tangible computer readable storage media as recited in claim 23, wherein the comparing of the one or more of the second difference values in the difference matrix to the one or more threshold values comprises comparing the absolute values of the one or more of the second differences values in the first and last rows and first and last columns of the difference matrix with an edge pixel value limit.

25. The one or more tangible computer readable storage media as recited in claim 24, wherein the comparing of the one or more of the second difference values in the difference matrix to the one or more threshold values comprises comparing the absolute values of the one or more of the second differences values not in either of the first and last rows and not in either of the first and last columns of the difference matrix with a center pixel value limit different than the edge pixel value limit.

26. The one or more tangible computer readable storage media as recited in claim 25, wherein the center pixel value limit is less than the edge pixel value limit.

* * * * *